(12) United States Patent
Oyanagi et al.

(10) Patent No.: US 7,619,015 B2
(45) Date of Patent: Nov. 17, 2009

(54) PHOTOCURABLE INK COMPOSITION

(75) Inventors: Takashi Oyanagi, Nagano (JP); Keitaro Nakano, Nagano (JP)

(73) Assignee: Eiko Epson Corporation, Tokyo (JP)

( * ) Notice: Subject to any disclaimer, the term of this patent is extended or adjusted under 35 U.S.C. 154(b) by 231 days.

(21) Appl. No.: 11/376,607

(22) Filed: Mar. 15, 2006

(65) Prior Publication Data

US 2007/0017415 A1  Jan. 25, 2007

(30) Foreign Application Priority Data

Mar. 17, 2005  (JP) ............ P.2005-077951
Mar. 17, 2005  (JP) ............ P.2005-077952

(51) Int. Cl.
*C09D 11/10* (2006.01)
*B05D 11/00* (2006.01)
*B41J 2/01* (2006.01)

(52) U.S. Cl. .............. 522/14; 522/28; 522/77; 522/78; 522/83; 522/84; 427/466

(58) Field of Classification Search ........... 522/83, 522/84, 14, 28, 77, 78; 427/466; 523/160
See application file for complete search history.

(56) References Cited

U.S. PATENT DOCUMENTS 5,623,001 A   4/1997  Figov
5,776,646 A * 7/1998  Hagi et al. ............... 430/108.6
6,467,897 B1 * 10/2002 Wu et al. ................. 347/102
2003/0225188 A1 * 12/2003 Horie ....................... 523/160

FOREIGN PATENT DOCUMENTS

JP  2001-115067  4/2001
JP  2002-363439  12/2002

OTHER PUBLICATIONS

Computer-Generated English Translation of Specification and Claims and Patent Abstracts of Japan of JP 2002-363439 dated Dec. 18, 2002.
Computer-Generated English Translation of Specification and Claims and Patent Abstracts of Japan of JP 2001-115067 dated Apr. 24, 2001.

* cited by examiner

*Primary Examiner*—Susan W Berman
(74) *Attorney, Agent, or Firm*—Ladas and Parry LLP

(57) ABSTRACT

The present invention relates to an ink composition containing fine particles having an amino group on surfaces thereof. According to the invention, there can be provided an ink composition which prevents volatilization or bleedout of an amine compound to cause no discharge of the amine compound into the environment and is also excellent in curability. Further, there can be provided an ink composition which is excellent in curing efficiency, surface curability and internal curability, and can prevent the occurrence of cracks.

6 Claims, No Drawings

PHOTOCURABLE INK COMPOSITION

FIELD OF THE INVENTION

The present invention relates to an ink composition. More particularly, the invention relates to an ultraviolet curing type ink composition which is curable by ultraviolet light, excellent in its curability, and low in toxicity. Further, the invention relates to an ultraviolet curing type ink composition which is curable by ultraviolet light and excellent in its curing efficiency, surface and internal curability, and in which the occurrence of cracks is inhibited.

BACKGROUND OF THE INVENTION

An ink jet recording method is a printing method in which droplets of an ink composition are allowed to fly and deposited on a recording medium such as paper to perform printing. This ink jet recording method is characterized by that images having high resolution and high quality can be printed at high speed. The ink composition used in the ink jet recording method is generally one mainly comprising an aqueous solvent and containing a coloring component and a wetting agent such as glycerin for the purpose of preventing clogging.

On the other hand, when printing is performed on a recording medium such as paper or cloth of a type that is hard for the aqueous ink composition to penetrate thereinto, or a plate or a film made of a material such as metal or plastics into which the aqueous ink composition does not penetrate, for example, a resin such as a phenol, melamine, vinyl chloride, acrylic or polycarbonate resin, the ink composition or a reaction solution is required to contain a component which can allow the coloring material to be stably fixed to the recording medium.

To such a demand, an ultraviolet curing type ink jet ink comprising a coloring material, an ultraviolet curing agent (polymerizable compound), a (photo)polymerization initiator and the like has been disclosed (for example, see patent document 1). Further, in this ultraviolet curing ink jet ink, various polymerization accelerators are used depending on its purpose.

Patent Document 1: U.S. Pat. No. 5,623,001

For example, amine compounds have been used for the purpose of preventing polymerization inhibition caused by oxygen. However, the amine compounds are not completely fixed into ink cured films even after the completion of ultraviolet curing reaction, and a phenomenon is observed in which they volatilize from the ink cured films after the elapse of a long period to contribute odors, or ooze out (bleedout) of surfaces of the ink cured films. Further, many of the amine compounds have toxicity to fish and give an environmental load, so that the use thereof has been unfavorable also in terms of the environment.

Furthermore, none which satisfies all of curing efficiency, surface curability, internal curability and prevention of the occurrence of cracks has been found in conventional ink compositions.

SUMMARY OF THE INVENTION

Then, the invention has been made in order to overcome the above-mentioned drawbacks of the prior art.

An object of the invention is to provide an ink composition which prevents volatilization or bleedout of an amine compound to cause no discharge of the amine compound into the environment and is excellent in curability.

Another object of the invention is to provide an ink composition which is excellent in curing efficiency, surface curability and internal curability, and can prevent the occurrence of cracks.

By the way, as for the judgment of surface curability herein, a state in which the polymerization reaction is inhibited by the influence of oxygen in the circumferential environment, whereby a surface is kept uncured though an inside is cured is taken as "surface curability is low". Further, as for the judgment of surface curability herein, a state in which only a surface is cured, and an inside is kept uncured is taken as "internal curability is low". The cracks as used herein mean crazes generated after curing.

The present inventors have conducted intensive studies, and as a result, have found that the above-mentioned objects can be achieved by employing the following constitution, thus coming to complete the invention.

That is to say, the invention is as follows:

(1) An ink composition comprising fine particles having an amino group on surfaces thereof;

(2) The ink composition according to the above-mentioned (1), wherein the above-mentioned fine particles are an inorganic compound;

(3) The ink composition according to the above-mentioned (1) or (2), wherein the above-mentioned fine particles are transparent; and (4) The ink composition according to the above-mentioned (1), wherein the composition further comprises fine particles having a polymerizable functional group.

The ink composition of the invention comprises fine particles having amino groups on surfaces thereof, thereby satisfying excellent polymerizability and low discharge properties of an amine compound.

Particularly, the ink composition of the invention comprises fine particles having amino groups on surfaces thereof, in place of a conventional amine compound which is a polymerization accelerator, whereby the particles are completely fixed after ultraviolet curing of the ink while maintaining excellent curability, resulting in no generation of an odor specific to the amine compound even after the elapse of a long period and no occurrence of bleedout.

Further, the invention also provides the following ink compositions:

(5) The ink composition according to the above-mentioned (1), containing at least a polymerizable compound, a photopolymerization initiator and a polymerization accelerator, wherein each of the polymerizable compound, the photopolymerization initiator and the polymerization accelerator comprises a combination of a plurality of compounds, wherein each of the polymerizable compound, the photopolymerization initiator and the polymerization accelerator comprises at least one compound having an amine structure, and wherein at least one of the polymerization accelerator is the above-mentioned fine particles having an amino group on surfaces thereof;

(6) The ink composition according to (5), wherein the amine structure-containing compound in the above-mentioned polymerizable compound accounts for 30% by weight or higher, in terms of weight ratio;

(7) The ink composition according to (5) or (6), wherein the above-mentioned fine particles are an inorganic compound;

(8) The ink composition according to any one of (5) to (7), wherein the above-mentioned fine particles are transparent; and (9) The ink composition according to any one of (5) to (8), which is of non-solvent type.

In the above-mentioned ink composition of (5) to (8) (hereinafter referred to as "ink composition of a second aspect of the invention"), the plural kinds of compounds are used in combination for each of the polymerizable compound, the photopolymerization initiator and the polymerization accelerator, at least one kind of each has an amine structure, and at least one kind of the polymerization accelerator contains the fine particles having an amino group on surfaces thereof, which makes it possible to obtain excellent curing efficiency, surface curability and internal curability and to prevent the occurrence of cracks.

DETAILED DESCRIPTION OF THE INVENTION

The ink composition of the invention will be described in detail below.

The fine particles having amino groups on surfaces thereof (hereinafter also simply referred to as amino group-containing fine particles), which are contained as a polymerization accelerator in the ink composition of the invention, are not particularly limited, as long as they achieve the operation and effect of the invention, and those called extender pigments are generally used. There are exemplified inorganic compounds such as silica, alumina, titania and calcium oxide, and particularly, transparent ones such as silica and alumina can be suitably used.

Although the size of the fine particles is not particularly limited, one having a particle size of 5 to 100 nm is preferred in terms of dispersion stability and transparency in the ultraviolet region and at visible light.

A method for preparing the amino group-containing fine particles is not particularly limited. To give an example, the particles are obtained by introducing amino groups to surfaces of the fine particles. Specific examples thereof include a method of preparing fine silica particles having a large number of hydroxyl groups on surfaces thereof by the sol-gel reaction of a tetraalkoxysilane such as tetraethoxysilane (TEOS) or tetramethoxysilane (TMOS), and introducing amino groups to the surfaces of the fine silica particles by the reaction of the hydroxyl groups with an amino group-containing compound, for example, an amino group-containing coupling agent.

The content of the amino group-containing fine particles in the ink composition of the invention is not particularly limited, and should be appropriately selected depending on the type of use mode, conditions, the relationship between the viscosity of the ink composition and polymerizability, and the like. However, it is preferably from 0.5% by weight to 10% by weight based on the total amount of the ink composition.

As another polymerization accelerator, polymerizable functional group-containing fine particles may be contained in the ink composition of the invention.

Further, another polymerization accelerator contained in the ink composition of the invention is not particularly limited. However, examples thereof include Darocure EHA, EDB (manufactured by Ciba Specialty Chemicals Corp.), the polymerizable functional group-containing fine particles and the like. Darocure EHA, EDB and the like are aminobenzoate derivatives, and reduce polymerization inhibition caused by oxygen.

The aminobenzoate derivative is one having no absorption in a wavelength region of 350 nm or more. Examples of such aminobenzoate derivative include but are not particularly limited to ethyl-4-dimethylaminobenzoate, 2-ethylhexyl-4-dimethylaminobenzoate and the like.

Although the polymerization accelerating mechanism of the fine particles to which the polymerizable functional groups have been introduced is not clear, it is presumed that radicals formed by cleavage of a photopolymerization initiator which has absorbed ultraviolet light are trapped on the surfaces of the fine particles to be stabilized, and easily start polymerization reaction with the polymerizable functional groups which have been introduced to the surfaces of the fine particles and a polymerizable compound adsorbed on the surfaces, thereby accelerating the polymerization reaction.

The polymerizable functional group-containing fine particles are not particularly limited, and are generally those called extender pigments, similarly to the above-mentioned amino-group containing fine particles.

Further, the polymerizable functional groups contained in the fine particles are not particularly limited, and there are exemplified an acryloyl group, a methacryloyl group and the like. Furthermore, it is also possible to use a polymerizable functional group having one or more double bonds.

Although the size of the fine particles is not particularly limited, one having a particle size of 5 to 200 nm is preferred.

A method for preparing the polymerizable functional group-containing fine particles is not particularly limited. To give an example, the particles are obtained by introducing polymerizable functional groups to surfaces of the fine particles. Specific examples thereof include a method of preparing fine silica particles having a large number of hydroxyl groups on surfaces thereof by the sol-gel reaction of a tetraalkoxysilane such as tetraethoxysilane (TEOS) or tetramethoxysilane (TMOS), and introducing polymerizable functional groups to the surfaces of the fine silica particles by the reaction of the hydroxyl groups with a polymerizable functional group-containing compound, for example, an acryloyl or methacryloyl group-containing coupling agent.

The content of the polymerizable functional group-containing fine particles in the ink composition of the invention is not particularly limited, and should be appropriately selected depending on the type of use mode, conditions, the relationship between the viscosity of the ink composition and polymerizability, and the like. However, it is preferably from 0.5% by weight to 10% by weight based on the total amount of the ink composition.

In the ink composition based on the second aspect of the invention, plural kinds of compounds are used in combination as a polymerization accelerator, at least one kind thereof is a compound having an amine structure, and further, at least one kind is fine particles having amino groups on surfaces thereof.

Components other than the amino group-containing fine particles, which are contained in the ink composition of the invention, are mainly a monomer which is a polymerizable compound and a photopolymerization initiator.

As the monomers, any of a monofunctional monomer, a bifunctional monomer and a trifunctional or higher functional monomer may be used. However, it is preferred that all monomers have a PII value of 2 or less.

Further, from the viewpoint of decreasing the viscosity of the ink composition, the amount of the bifunctional monomer and multifunctional monomer used is preferably as small as possible.

The monofunctional monomers, bifunctional monomers and multifunctional monomers having a PII value of 2 or less, which can be used in the ink composition of the invention, are exemplified in the following Table 1.

TABLE 1

| Material Name | Viscosity (mPa·s) | P.I.I. |
|---|---|---|
| Monofunctional Monomer | | |
| N-Vinylformamide (NVF, Beamset 770, manufactured by Arakawa Chemical Industries Ltd.) | 4.3 | 0.4 |
| (2-Methyl-2-ethyl-1,3-dioxolane-4-yl)methyl acrylate (MEDOL-10, manufactured by Osaka Organic Chemical Industry Ltd.) | 5.1 | 1.3 |
| (2-Methyl-2-isobutyl-1,3-dioxolane-4-yl)methyl acrylate (MIBDOL-10, manufactured by Osaka Organic Chemical Industry Ltd.) | 5.3 | 1.0 |
| Phenoxyethyl acrylate (Viscoat #192, manufactured by Osaka Organic Chemical Industry Ltd.) | 3.3 | 1.7 |
| Isobornyl acrylate (IBXA, manufactured by Osaka Organic Chemical Industry Ltd.) | 2.6 | 0.6 |
| Methoxydiethylene glycol monoacrylate (Blenmer PME-100, manufactured by NOF Corporation) | 2 | 0.7 |
| Acryloylmorpholine (ACMO, manufactured by Kohjin Co., Ltd.) | 12 | 0.5 |
| Bifunctional Monomer | | |
| Ethylene glycol dimethacrylate (Light Ester EG, manufactured by Kyoeisha Chemical Co., Ltd) | 3 | 0.6 |
| Diethylene glycol dimethacrylate (Light Ester 2EG, manufactured by Kyoeisha Chemical Co., Ltd) | 5 | 0.5 |
| Tripropylene glycol diacrylate (Aronix M-220, manufactured by Toagosei Co., Ltd) | 12 | 1.6 |
| 1,9-Nonanediol diacrylate (Viscoat #260, manufactured by Osaka Organic Chemical Industry Ltd.) | 21 | 2.0 |
| Polyethylene glycol #400 diacrylate (NK Ester A400, manufactured by Shin-Nakamura Chemical Co., Ltd.) | 58 | 0.4 |
| Tetraethylene glycol dimethacrylate (NK Ester 4G, manufactured by Shin-Nakamura Chemical Co., Ltd.) | 14 | 0.5 |
| 1,6-Hexanediol dimethacrylate (NK Ester HD-N, manufactured by Shin-Nakamura Chemical Co., Ltd.) | 6 | 0.5 |
| Neopentyl glycol dimethacrylate (NK Ester NPG, manufactured by Shin-Nakamura Chemical Co., Ltd.) | 7 | 0.0 |
| 2-Hydroxy-1,3-dimethacryloxypropane (NK Ester 701, manufactured by Shin-Nakamura Chemical Co., Ltd.) | 37 | 0.6 |
| Multifunctional Monomer | | |
| Trimethylolpropane trimethacrylate (NK Ester TMPT, manufactured by Shin-Nakamura Chemical Co., Ltd.) | 42 | 0.8 |
| Trimethylolpropane EO adduct triacrylate (Viscoat #360, manufactured by Osaka Organic Chemical Industry Ltd.) | 55 | 1.5 |
| Trimethylolpropane PO adduct triacrylate (New Frontier TMP-3P, manufactured by Dai-Ichi Kogyo Seiyaku Co., Ltd.) | 60 | 0.1 |
| Glycerin PO adduct triacrylate (Viscoat #GPT, manufactured by Osaka Organic Chemical Industry Ltd.) | 75 | 0.8 |

The viscosity shown in the above-mentioned table is measured values at 25° C.

In the ink composition based on the second aspect of the invention, plural kinds of monomers are used in combination as a polymerizable compound, and at least one kind thereof is a compound having an amine structure.

There is no particular limitation on the polymerizable compound used in the ink composition based on the second aspect, as long as it is one polymerized by radicals or ions generated from a photopolymerization initiator. Such a polymerizable compound means a molecule which can form a constituent unit of a basic structure of a polymer molecule. Such a polymerizable compound is also called a photopolymerizable monomer, and includes a monofunctional acrylate and methacrylate, and a multifunctional acrylate and methacrylate.

Typical examples of such polymerizable compounds include ethylene glycol diacrylate, diethylene glycol diacrylate, neopentyl glycol diacrylate, 1,4-butanediol diacrylate, 1,6-hexanediol diacrylate, hydroxypioperinic acid ester neopentyl glycol diacrylate, trimethylolpropane triacrylate, pentaerythtol triacrylate, dipentaerythtol hexaacrylate, acryloylmorpholine, 2-phenoxyethyl acrylate, phthalic acid hydrogen-(2,2,2-triacroyloxymethyl)ethyl, dipentaerythtol polyacrylate, dipentaerythtol polyacrylate, tripropylene glycol diacrylate, glycerin EO adduct (modified) triacrylate, isobornyl acrylate, 2-methoxyethyl acrylate, 2-ethoxyethyl acrylate, 3-methoxybutyl acrylate, N-isopropylacrylamide, N,N-dimethylacrylamide, N,N-dimethylaminopropylacrylamide, N-vinylformamide, N-vinylacetamide, N-vinylcaprolactam, N-vinylpyrrolidone, N-vinylcarbazole and the like. Preferred are acryloylmorpholine, 2-phenoxyethyl acrylate, phthalic acid hydrogen-(2,2,2-triacroyloxymethyl)ethyl, dipentaerythtol polyacrylate, dipentaerythtol polyacrylate, tripropylene glycol diacrylate, glycerin EO adduct triacrylate, N-vinylformamide and N-vinylcaprolactam.

Of the above, the ones having an amine structure include N-vinylformamide, N-vinylcaprolactam, N-vinylpyrrolidone, N-vinylcarbazole, N-isopropylacrylamide, N,N-dimethylacrylamide, N,N-dimethylaminopropylacrylamide and the like.

The photopolymerization initiator used in the ink composition of the invention is, for example, one which absorbs ultraviolet light in a region of about 250 nm to 450 nm or visible light to form radicals, thereby initiating polymerization of the above-mentioned monomer.

Typical examples of the photopolymerization initiators used in the invention include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxantone, 2-chlorothioxantone, isopropylthioxantone, 2-methylthioxantone, polychlorinated polyphenyl, hexachlorobenzene and the like, and preferred are isobutyl benzoin ether and 1-phenyl-1,2-propanedione-2-(o-ethoxycarbonyl)oxime.

Further, there can also be used photopolymerization initiators available under the trade names of Vicure 10 and 30 (manufactured by Stauffer Chemical), Irgacure 127, 184, 651, 2959, 907, 754, 369, 379, 819, 1700, 1800, 1850, 1870, 4265 and OXE01, and Darocure 1173 and TPO (manufactured by Ciba Specialty Chemicals), Quantacure CTX and ITX (manufactured by Aceto Chemical) and Lucirin TPO (manufactured by BASF).

The photopolymerization initiator contained in the ink composition based on the second aspect of the invention is one in which plural kinds are used in combination, and at least one kind thereof is a compound having an amine structure.

Of the above, the ones having an amine structure include Irgacure 369, 379, 907 and OXE01 and the like.

Further, the ink composition of the invention may contain an oligomer as a polymerizable compound, in addition to the above-mentioned monomers.

The oligomer which can be used in the ink composition of the invention means a molecule having a medium-sized relative molecular mass and having a structure constituted by few repetitions, generally about 2 to 20 repetitions, of a unit substantially or conceptually obtained from a molecule having a small relative molecular mass. Further, the oligomer used in the invention is also one called a photopolymerizable prepolymer, a base resin or an acrylic oligomer.

The oligomer has one to several polymerizable functional groups, so that it has the property of inducing polymerization reaction with the monomer and the like by ultraviolet irradiation and the like to cause crosslinking and polymerization.

The oligomers used in the invention include a polyester acrylate, a polyurethane acrylate, an epoxy acrylate, a polyether acrylate, an oligo acrylate, an alkyd acrylate, a polyol acrylate and the like, for example, by the molecular structure constituting a skeleton, and preferred are a polyester acrylate and a polyurethane acrylate.

As the oligomer used in the invention, there is used one having a molecular weight ranging from about 5,000 to 20,000, preferably from about 5,000 to 10,000.

The ink composition of the invention may contain a coloring material.

The coloring material contained in the ink composition of the invention may be either a dye or a pigment. However, a pigment is more advantageous in terms of image durability of printed matter.

As the dyes used in the invention, there can be used various dyes which are generally used for ink jet recording, such as a direct dye, an acid dye, a food dye, a basic dye, a reactive dye, a disperse dye, a vat dye, a soluble vat dye and a reactive disperse dye.

As the pigments used in the invention, inorganic pigments and organic pigments can be used without particular limitation.

As the inorganic pigments, there can be used carbon blacks produced by known processes such as a contact process, a furnace process and a thermal process, as well as titanium oxide and iron oxide. Further, as the organic pigments, there can be used azo pigments (including an azo lake, an insoluble azo pigment, a condensed azo pigment, a chelate azo pigment and the like), polycyclic pigments (for example, a phthalocyanine pigment, a perylene pigment, a perynone pigment, an anthraquinone pigment, a quinacridone pigment, a dioxazine pigment, a thioindigo pigment, an isoindolinone pigment, a quinophthalone pigment and the like), dye chelates (for example, a basic dye type chelate, acid dye type chelate and the like), nitro pigments, nitroso pigments, aniline black and the like.

According to a preferred embodiment of the invention, these pigments are preferably added to the ink composition as pigment dispersions obtained by dispersing them in aqueous media with dispersing agents or surfactants. As the preferred dispersing agents, there can be used dispersing agents which are conventionally used for preparing pigment dispersions, for example, a polymeric dispersing agent. By the way, it will be apparent to one skilled in the art that the dispersing agent and surfactant contained in this pigment dispersion also function as a dispersing agent and surfactant for the ink composition.

The amount of the coloring agent added in the ink composition preferably ranges from about 0.1 to 25% by weight, and more preferably ranges from about 0.5 to 15% by weight.

The ink composition of the invention may contain an aqueous solvent. Further, as an arbitrary component, there may be added a resin emulsion, an inorganic oxide colloid, a wetting agent, a pH adjuster, a preservative, a mildewproofing agent or the like.

In addition, it is further preferred that the ink composition of the invention is a non-solvent type ink composition containing no organic solvent which is used for a decrease in viscosity or improvement in adhesion, has no polymerizability and has volatility.

The ink composition of the invention can be applied to all known conventional image recording and printing methods.

For example, it can be applied to the image recording and printing methods such as an ink jet method, an offset method, a gravure method and a thermal transfer method. In particular, the ink composition of the invention is suitable for ink jet recording.

In the ink jet recording method using the ink composition of the invention, the ink composition is deposited on a recording medium, and then, irradiated with ultraviolet light.

The ultraviolet dose varies depending on the amount of the ink composition deposited on a substrate, a recording medium or the like and the thickness thereof, and can not be exactly specified. Preferred conditions should be appropriately selected. For example, however, it ranges from 10 $mJ/cm^2$ to 10,000 $mJ/cm^2$, and preferably ranges from 50 $mJ/cm^2$ to 6,000 $mJ/cm^2$. When the ultraviolet dose is within such a range, the curing reaction can be sufficiently performed.

Further, as the ultraviolet light to be irradiated, it is preferred in terms of safety and environment that ultraviolet light in a long wavelength region of 350 nm of more which generates no ozone is used. Furthermore, it is preferred that the ultraviolet light to be irradiated is not one having a continuous spectrum, but one having a narrow light emission peak width. The wavelength region of this light emission peak is preferably within the range of 350 to 420 nm.

Although means for ultraviolet irradiation are not particularly limited, ultraviolet light emitting semiconductor elements such as ultraviolet LEDs and ultraviolet light emitting semiconductor lasers are preferred in terms of energy consumption, miniaturization and the life of lamps. When the ultraviolet LED is used, it is preferred that, for example, the plural kinds of LEDs having light emitting peak wavelengths of 365 nm, 380 nm, 395 nm, 400 nm and the like are combined.

Other means for ultraviolet irradiation include lamps such as a metal halide lamp, a xenon lamp, a carbon arc lamp, a chemical lamp, a low-pressure mercury lamp and a high-pressure mercury lamp. For example, commercially available lamps such as H Lamp, D Lamp and V Lamp manufactured by Fusion System can also be used.

Further, in an ink jet recording method using the ink composition of the invention, heating may be performed before, concurrently with or after ultraviolet light irradiation. Heating includes a method of heating by bringing a heat source into contact with the recording medium, a method of heating without contact with the recording medium, for example, by irradiating a far infrared ray, a near infrared ray or a microwave (an electromagnetic wave having the maximum wavelength at about 2,450 MHz) or by blowing hot air, and the like.

EXAMPLES

The present invention will be illustrated in greater detail with reference to the following Examples, but the invention should not be construed as being limited thereto.

Examples 1A to 3A and Comparative Examples 1A to 8A

1A. Preparation of Polymerization Accelerating Fine Particles 1A

To a conical flask having a volume of 200 ml, 88.1 parts by weight of Silica Sol IPA-ST (manufactured by Nissan Chemical Industries, Ltd., an isopropyl alcohol (hereinafter abbreviated as IPA) dispersion having a silica concentration of 30% by weight) was added, and 7.9 parts by weight of a silane coupling agent, 3-dimethylaminopropyltrimethoxysilane (manufactured by Aldrich), was added thereto. Hydrochloric acid having a concentration of 0.05 mol/liter was added in an amount of 4 parts by weight with stirring with a magnetic stirrer, and reaction was conducted with stirring at room temperature for 24 hours. As a result, IPA dispersion A containing polymerization accelerating fine particles 1A was obtained.

2A. Preparation of Polymerizable Fine Particles 1A

To a conical flask having a volume of 200 ml, 88.5 parts by weight of Silica Sol IPA-ST (manufactured by Nissan Chemical Industries, Ltd., an isopropyl alcohol (hereinafter abbreviated as IPA) dispersion having a silica concentration of 30% by weight) was added, and 7.5 parts by weight of a silane coupling agent, KBM-5103 (manufactured by Shin-Etsu Chemical Co., Ltd.), was added thereto. Hydrochloric acid having a concentration of 0.05 mol/liter was added in an amount of 4 parts by weight with stirring with a magnetic stirrer, and reaction was conducted with stirring at room temperature for 24 hours. As a result, IPA dispersion B containing polymerizable fine particles 1A was obtained.

3A. Preparation of Ink Compositions (1) Preparation of Ink Composition 1A (Example 1A)

To a round flask having a volume of 300 ml, 70 parts by weight of N-vinylformamide (hereinafter NVF) and 100 parts by weight of dispersion A were added, and IPA was removed by distillation using a rotary evaporator to obtain monomer solution C containing 30% by weight of polymerization accelerating fine particles 1A.

Subsequently, 20 g of this monomer solution C was added to a brown sample vial having a volume of 100 ml, and 64 g of NVF, 15 g of tripropylene glycol diacrylate (TPGDA) and 1.0 g of Irgacure 819 were added thereto, followed by stirring with a magnetic stirrer for 30 minutes to prepare ink composition 1A. The composition of this ink composition 1A is shown in the following Table 2A.

(2) Preparation of Ink Composition 2A (Example 2A)

To a brown sample vial having a volume of 100 ml, 20 g of the above-mentioned monomer solution C was added and 54 g of NVF, 15 g of tripropylene glycol diacrylate, 10 g of EO-modified glycerin triacrylate (A-Cly-3E) and 1.0 g of Irgacure 819 were added thereto, followed by stirring with a magnetic stirrer for 30 minutes to prepare ink composition 2A. The composition of this ink composition 2A is shown in the following Table 2A.

(3) Preparation of Ink Composition 3A (Example 3A)

To a round flask having a volume of 300 ml, 70 parts by weight of N-vinylformamide (hereinafter NVF) and 100 parts by weight of dispersion B were added, and IPA was removed by distillation using a rotary evaporator to obtain monomer solution D containing 30% by weight of polymerizable fine particles 1A.

To a brown sample vial having a volume of 100 ml, 15 g of the above-mentioned monomer solution C and 15 g of monomer solution D were added, and 54 g of NVF, 10 g of tripropylene glycol diacrylate, 5.0 g of EO-modified glycerin triacrylate and 1.0 g of Irgacure 819 were added thereto, followed by stirring with a magnetic stirrer for 30 minutes to prepare ink composition 3A. The composition of this ink composition 3A is shown in the following Table 2A.

(4) Preparation of Ink Composition 4A (Comparative Example 1A)

To a brown sample vial having a volume of 100 ml, 79 g of NVF, 20 g of tripropylene glycol diacrylate and 1.0 g of Irgacure 819 were added, followed by stirring with a magnetic stirrer for 30 minutes to prepare ink composition 4A. The composition of this ink composition 4A is shown in the following Table 2A.

(5) Preparation of Ink Composition 5A (Comparative Example 2A)

To a brown sample vial having a volume of 100 ml, 78 g of NVF, 20 g of tripropylene glycol diacrylate, 1.0 g of Irgacure 819 and 1.0 g of Darocur EHA were added, followed by stirring with a magnetic stirrer for 30 minutes to prepare ink composition 5A. The composition of this ink composition 5A is shown in the following Table 2A.

(6) Preparation of Ink Composition 6A (Comparative Example 3A)

To a brown sample vial having a volume of 100 ml, 76 g of NVF, 20 g of tripropylene glycol diacrylate, 1.0 g of Irgacure 819 and 3.0 g of Darocur EHA were added, followed by stirring with a magnetic stirrer for 30 minutes to prepare ink composition 6A. The composition of this ink composition 6A is shown in the following Table 2A.

(7) Preparation of Ink Composition 7A (Comparative Example 4A)

To a brown sample vial having a volume of 100 ml, 74 g of NVF, 20 g of tripropylene glycol diacrylate, 1.0 g of Irgacure 819 and 5.0 g of Darocur EHA were added, followed by stirring with a magnetic stirrer for 30 minutes to prepare ink composition 7A. The composition of this ink composition 7A is shown in the following Table 2A.

(8) Preparation of Ink Composition 8A (Comparative Example 5A)

To a round flask having a volume of 300 ml, 70 parts by weight of N-vinylformamide (hereinafter NVF) and 100 parts by weight of Silica Sol IPA-ST were added, and IPA was removed by distillation using a rotary evaporator to obtain monomer solution E containing 30% by weight of fine silica particles.

To a brown sample vial having a volume of 100 ml, 20 g of this solution E was added, and 59 g of NVF, 20 g of tripropylene glycol diacrylate and 1.0 g of Irgacure 819 were added thereto, followed by stirring with a magnetic stirrer for 30 minutes to prepare ink composition 8A. The composition of this ink composition 8A is shown in the following Table 2A.

(9) Preparation of Ink Composition 9A (Comparative Example 6A)

To a brown sample vial having a volume of 100 ml, 20 g of the above-mentioned monomer solution D was added, and 64 g of NVF, 15 g of tripropylene glycol diacrylate and 1.0 g of Irgacure 819 were added thereto, followed by stirring with a magnetic stirrer for 30 minutes to prepare ink composition 9A. The composition of this ink composition 9A is shown in the following Table 2A.

(10) Preparation of Ink Composition 10A (Comparative Example 7A)

To a brown sample vial having a volume of 100 ml, 20 g of the above-mentioned monomer solution D was added, and 63 g of NVF, 15 g of tripropylene glycol diacrylate, 1.0 g of Irgacure 819 and 1.0 g of Darocur EHA were added thereto, followed by stirring with a magnetic stirrer for 30 minutes to prepare ink composition 10A. The composition of this ink composition 10A is shown in the following Table 2A.

(11) Preparation of Ink Composition 10A (Comparative Example 8A)

To a brown sample vial having a volume of 100 ml, 20 g of the above-mentioned monomer solution D was added, and 61 g of NVF, 15 g of tripropylene glycol diacrylate, 1.0 g of Irgacure 819 and 3.0 g of Darocur EHA were added thereto, followed by stirring with a magnetic stirrer for 30 minutes to prepare ink composition 11A. The composition of this ink composition 11A is shown in the following Table 2A.

4A. Curing Experiment

The above-mentioned ink composition was dropped onto a glass substrate, and treated under curing conditions of an ultraviolet wavelength of 365 nm, an irradiation intensity of 22 mW/cm$^2$, an irradiation time of 3 seconds and an integrated light volume of 66 mJ/cm$^2$. Then, the following visual evaluation of curability was conducted.

Evaluation Indexes
A: Completely cured.
B: Almost cured, but incomplete.
C: Only partially cured.

5. Volatility Accelerating Test

The sample after the curing test was dried in a dryer of 70° C. for 24 hours, and a decrease in its weight was measured.

The results of the curing experiment and the volatility accelerating test are shown in Table 2A.

temperature for 24 hours. As a result, IPA dispersion A containing polymerization accelerating fine particles 1B was obtained.

2B. Preparation of Ink Compositions (1) Preparation of Transparent Ink Composition 1B (Example 1B)

To a round flask having a volume of 300 ml, 70 parts by weight of N-vinylformamide (NVF; Beamset 770, manufactured by Arakawa Chemical Industries Ltd.) and 100 parts by weight of IPA dispersion A were added, and IPA was removed by distillation using a rotary evaporator to obtain monomer solution B containing 30% by weight of polymerization accelerating fine particles 1B.

Subsequently, 20 g of this monomer solution B was added to a brown sample vial having a volume of 100 ml, and 16 g of NVF, 27 g of 2-methoxyethyl acrylate (2-MTA; manufactured by Osaka Organic Chemical Industry Ltd.), 25 g of tripropylene glycol diacrylate (TPGDA; Aronix M-220, manufactured by Toagosei Co., Ltd), 10 g of glycerin EO-modified triacrylate (A-Gly-3E; manufactured by Shin-Nakamura Chemical Co., Ltd.), 0.8 g of Irgacure 819, 0.2 g of

TABLE 2A

| | Polymerization Accelerating Fine Particles 1 (wt %) | Polymerizable Fine Particles 1 (wt %) | Fine Silica Particles (wt %) | NVF (wt %) | TPGDA (wt %) | A-Gly-3E (wt %) | Irgacure 819 (wt %) | Darocur EHA (wt %) | Curability | Bleedout | Rate of Weight Decrease (wt %) |
|---|---|---|---|---|---|---|---|---|---|---|---|
| Example 1 | 6.0 | — | — | 78.0 | 15.0 | — | 1.0 | — | A | No | −0.13 |
| Example 2 | 6.0 | — | — | 68.0 | 15.0 | 10.0 | 1.0 | — | A | No | −0.11 |
| Example 3 | 4.5 | 4.5 | — | 75.0 | 10.0 | 5.0 | 1.0 | — | A | No | −0.15 |
| Comp. Ex. 1 | — | — | — | 79.0 | 20.0 | — | 1.0 | — | C | No | — |
| Comp. Ex. 2 | — | — | — | 78.0 | 20.0 | — | 1.0 | 1.0 | B | No | −1.04 |
| Comp. Ex. 3 | — | — | — | 76.0 | 20.0 | — | 1.0 | 3.0 | A | Observed | −3.14 |
| Comp. Ex. 4 | — | — | — | 74.0 | 20.0 | — | 1.0 | 5.0 | A | Observed | −4.03 |
| Comp. Ex. 5 | — | — | 6.0 | 73.0 | 20.0 | — | 1.0 | — | C | No | — |
| Comp. Ex. 6 | — | 6.0 | — | 78.0 | 15.0 | — | 1.0 | — | B | No | −0.16 |
| Comp. Ex. 7 | — | 6.0 | — | 77.0 | 15.0 | — | 1.0 | 1.0 | B | No | −1.10 |
| Comp. Ex. 8 | — | 6.0 | — | 75.0 | 15.0 | — | 1.0 | 3.0 | A | Observed | −3.20 |

* Rate of Weight Decrease: {(Weight after curing and after heat treatment − weight after curing and before heat treatment)/(weight of after curing and before heat treatment)} × 100
* Bleedout: A phenomenon in which an uncured liquid component in the ultraviolet cured ink composition oozes out In Examples 1A, 2A and 3A, curing is completely performed, there is no bleedout, and the rate of weight decrease is low, thus obtaining the results to be satisfied. However, in Comparative Examples 1A to 8A, the results are insufficient in either or both of the curing experiment and the volatility accelerating test.

Examples 1B to 6B and Comparative Examples 1B to 12B

1B. Preparation of Polymerization Accelerating Fine Particles 1B

To a conical flask having a volume of 200 ml, 88.1 parts by weight of Silica Sol IPA-ST (manufactured by Nissan Chemical Industries, Ltd., an isopropyl alcohol (hereinafter abbreviated as IPA) dispersion having a silica concentration of 30% by weight) was added, and 7.7 parts by weight of a silane coupling agent, 3-dimethylaminopropyltrimethoxysilane (manufactured by Aldrich), was added thereto. Hydrochloric acid having a concentration of 0.05 mol/liter was added in an amount of 4 parts by weight with stirring with a magnetic stirrer, and reaction was conducted with stirring at room Irgacure 369 and 1.0 g of Darocure EHA were added thereto, followed by stirring with a magnetic stirrer for 30 minutes to prepare transparent ink composition 1B.

| | |
|---|---|
| NVF | 30.0% by weight |
| 2-Methoxyethyl acrylate | 27.0% by weight |
| Tripropylene glycol diacrylate | 25.0% by weight |
| Glycerin EO-modified triacrylate | 10.0% by weight |
| Irgacure 819 | 0.8% by weight |
| Irgacure 369 | 0.2% by weight |
| Darocur EHA | 1.0% by weight |
| Polymerization accelerating fine particles 1B | 6.0% by weight |

(2) Preparation of Transparent Ink Composition 2B (Example 2B)

To a brown sample vial having a volume of 100 ml, 20 g of this monomer solution B was added, and 11 g of NVF, 29 g of N-vinylcaprolactam (NVCap; manufactured by Degussa), 28 g of tripropylene glycol diacrylate and 10 g of glycerin EO-modified triacrylate were taken, followed by mixing by stirring with a magnetic stirrer for 30 minutes. Then, 0.8 g of Irgacure 819, 0.2 g of Irgacure 369 and 1.0 g of Darucure EHA (manufactured by Ciba Specialty Chemicals) were added thereto, followed by stirring with a magnetic stirrer for 30 minutes to prepare transparent ink composition 2B.

| | |
|---|---|
| NVF | 25.0% by weight |
| N-Vinylcaprolactam | 29.0% by weight |
| Tripropylene glycol diacrylate | 28.0% by weight |
| Glycerin EO-modified triacrylate | 10.0% by weight |
| Irgacure 819 | 0.8% by weight |
| Irgacure 369 | 0.2% by weight |
| Darocur EHA | 1.0% by weight |
| Polymerization accelerating fine particles 1B | 6.0% by weight |

(3) Preparation of Transparent Ink Composition 3B (Example 3B)

To a brown sample vial having a volume of 100 ml, 10 g of the above-mentioned monomer solution B was added, and 58 g of NVF, 20 g of tripropylene glycol diacrylate, 10 g of glycerin EO-modified triacrylate, 0.5 g of Irgacure 369, 0.5 g of Irgacure 907 and 1.0 g of Darucur EHA were added thereto, followed by stirring with a magnetic stirrer for 30 minutes to prepare transparent ink composition 3B.

| | |
|---|---|
| NVF | 65.0% by weight |
| Tripropylene glycol diacrylate | 20.0% by weight |
| Glycerin EO-modified triacrylate | 10.0% by weight |
| Irgacure 369 | 0.5% by weight |
| Irgacure 907 | 0.5% by weight |
| Darocur EHA | 1.0% by weight |
| Polymerization accelerating fine particles 1B | 3.0% by weight |

(4) Preparation of Cyan Ink Composition 1B (Example 4B)

Cyan ink composition 1B having the following composition was prepared. The preparation was performed in the following manner. A pigment that is a coloring material was mixed with isopropanol (hereinafter IPA), and the mixture was dispersed together with glass beads (diameter: 1.7 mm, a 1.5-fold excess of the mixture (weight)) for 2 hours in a sand mill (manufactured by Yasukawa Seisakusho). Then, the glass beads were separated to obtain 15% by weight IPA pigment dispersion C.

To a round flask having a volume of 300 ml, 85 parts by weight of NVF and 100 parts by weight of IPA pigment dispersion C were added, and IPA was removed by distillation using a rotary evaporator to obtain pigment dispersion D containing 15% by weight of P. B. 15:3.

Into a brown sample vial having a volume of 100 ml, 31.0 g of NVF, 17.5 g of tripropylene glycol diacrylate and 7.5 g of glycerin EO-modified triacrylate were weighed, and 2.4 g of Irgacure 819, 0.6 g of Irgacure 369 and 1.0 g of Darocur EHA were added thereto, followed by stirring with a magnetic stirrer for 30 minutes. After the respective components were thoroughly dissolved and mixed, 20.0 g of monomer solution B and 20.0 g of pigment dispersion D were added, followed by further mixing by stirring for 1 hour to prepare cyan ink composition 1B having the following composition:

| | |
|---|---|
| NVF | 62.0% by weight |
| Tripropylene glycol diacrylate | 17.5% by weight |
| Glycerin EO-modified triacrylate | 7.5% by weight |
| Irgacure 819 | 2.4% by weight |
| Irgacure 369 | 0.6% by weight |
| Darocur EHA | 1.0% by weight |
| C.I. Pigment Blue 15:3 (coloring material) | 3.0% by weight |
| Polymerization accelerating fine particles 1B | 6.0% by weight |

(5) Preparation of Black Ink Composition 1B (Example 5B)

Black ink composition 1B was prepared in the same manner as in the case of the above-mentioned cyan ink composition 1B with the exception that the ink composition was changed to the following.

A pigment that is a coloring material was mixed with isopropanol (hereinafter IPA), and the mixture was dispersed together with glass beads (diameter: 1.7 mm, a 1.5-fold excess of the mixture (weight)) for 2 hours in a sand mill (manufactured by Yasukawa Seisakusho). Then, the glass beads were separated to obtain 15% by weight IPA pigment dispersion E.

To a round flask having a volume of 300 ml, 85 parts by weight of NVF and 100 parts by weight of IPA pigment dispersion E were added, and IPA was removed by distillation using a rotary evaporator to obtain pigment dispersion F containing 15% by weight of P. Bk 7.

Into a brown sample vial having a volume of 100 ml, 23.5 g of NVF, 17.5 g of tripropylene glycol diacrylate and 15.0 g of glycerin EO-modified triacrylate were weighed, and 2.4 g of Irgacure 819, 0.6 g of Irgacure 369 and 1.0 g of Darocur EHA were added thereto, followed by stirring with a magnetic stirrer for 30 minutes. After the respective components were thoroughly dissolved and mixed, 20.0 g of monomer solution B and 20.0 g of pigment dispersion F were added, followed by further mixing by stirring for 1 hour to prepare black ink composition 1B having the following composition:

| | |
|---|---|
| NVF | 54.5% by weight |
| Tripropylene glycol diacrylate | 17.5% by weight |
| Glycerin EO-moditied triacrylate | 15.0% by weight |
| Irgacure 819 | 2.4% by weight |
| Irgacure 369 | 0.6% by weight |
| Darocur EHA | 1.0% by weight |
| C.I. Pigment Black 7 (coloring material) | 3.0% by weight |
| Polymerization accelerating fine particles 1B | 6.0% by weight |

(6) Preparation of White Ink Composition 1B (Example 6B)

White ink composition 1B was prepared in the same manner as in the case of the above-mentioned cyan ink composition 1B with the exception that the ink composition was changed to the following.

A pigment that is a coloring material was mixed with isopropanol (hereinafter IPA), and the mixture was dispersed together with glass beads (diameter: 1.7 mm, a 1.5-fold excess of the mixture (weight)) for 2 hours in a sand mill (manufactured by Yasukawa Seisakusho). Then, the glass beads were separated to obtain 15% by weight IPA pigment dispersion G.

To a round flask having a volume of 300 ml, 85 parts by weight of NVF and 100 parts by weight of IPA pigment dispersion G were added, and IPA was removed by distillation using a rotary evaporator to obtain pigment dispersion H containing 15% by weight of fine titanium dioxide particles.

Into a brown sample vial having a volume of 100 ml, 11.0 g of NVF, 17.5 g of tripropylene glycol diacrylate and 7.5 g of glycerin EO-modified triacrylate were weighed, and 2.4 g of Irgacure 819, 0.6 g of Irgacure 369 and 1.0 g of Darocur EHA were added thereto, followed by stirring with a magnetic stirrer for 30 minutes. After the respective components were thoroughly dissolved and mixed, 20.0 g of monomer solution B and 40.0 g of pigment dispersion H were added, followed by further mixing by stirring for 1 hour to prepare white ink composition 1B having the following composition:

| | |
|---|---|
| NVF | 59.0% by weight |
| Tripropylene glycol diacrylate | 17.5% by weight |
| Glycerin EO-modified triacrylate | 7.5% by weight |
| Irgacure 819 | 2.4% by weight |
| Irgacure 369 | 0.6% by weight |
| Darocur EHA | 1.0% by weight |
| Fine titanium dioxide particles (coloring material) | 6.0% by weight |
| Polymerization accelerating fine particles 1B | 6.0% by weight |

(7) Preparation of Transparent Ink Composition 4B (Comparative Example 1B)

Transparent ink composition 4B was prepared in the same manner as in Examples 1B to 4B with the exception that the composition was changed to the following:

| | |
|---|---|
| NVF | 96.0% by weight |
| Irgacure 819 | 3.0% by weight |
| Darocur EHA | 1.0% by weight |

(8) Preparation of Transparent Ink Composition 5B (Comparative Example 2B)

Transparent ink composition 5B was prepared in the same manner as in Examples 1B to 4B with the exception that the composition was changed to the following:

| | |
|---|---|
| NVF | 96.0% by weight |
| Irgacure 819 | 2.4% by weight |
| Irgacure 369 | 0.6% by weight |
| Darocur EHA | 1.0% by weight |

(9) Preparation of Transparent Ink Composition 6B (Comparative Example 3B)

Transparent ink composition 6B was prepared in the same manner as in Examples 1B to 4B with the exception that the composition was changed to the following:

| | |
|---|---|
| NVF | 93.0% by weight |
| Irgacure 819 | 2.4% by weight |
| Irgacure 369 | 0.6% by weight |
| Darocur EHA | 1.0% by weight |
| Polymerization accelerating fine particles 1B | 3.0% by weight |

(10) Preparation of Transparent Ink Composition 7B (Comparative Example 4B)

Transparent ink composition 7B was prepared in the same manner as in Examples 1B to 4B with the exception that the composition was changed to the following:

| | |
|---|---|
| NVF | 93.0% by weight |
| Irgacure 819 | 3.0% by weight |
| Darocur EHA | 1.0% by weight |
| Polymerization accelerating fine particles 1B | 3.0% by weight |

(11) Preparation of Transparent Ink Composition 8B (Comparative Example 5B)

Transparent ink composition 8B was prepared in the same manner as in Examples 1B to 4B with the exception that the composition was changed to the following:

| | |
|---|---|
| NVF | 83.0% by weight |
| Glycerin EO-modified triacrylate | 10.0% by weight |
| Irgacure 819 | 3.0% by weight |
| Darocur EHA | 1.0% by weight |
| Polymerization accelerating fine particles 1B | 3.0% by weight |

(12) Preparation of Transparent Ink Composition 9B (Comparative Example 6B)

Transparent ink composition 9B was prepared in the same manner as in Examples 1B to 4B with the exception that the composition was changed to the following:

| | |
|---|---|
| NVF | 86.0% by weight |
| Glycerin EO-modified triacrylate | 10.0% by weight |
| Irgacure 819 | 3.0% by weight |
| Darocur EHA | 1.0% by weight |

(13) Preparation of Transparent Ink Composition 10B (Comparative Example 7B)

Transparent ink composition 10B was prepared in the same manner as in Examples 1B to 4B with the exception that the composition was changed to the following:

| | |
|---|---|
| NVF | 66.0% by weight |
| Tripropylene glycol diacrylate | 20.0% by weight |
| Glycerin EO-modified triacrylate | 10.0% by weight |
| Irgacure 819 | 3.0% by weight |
| Darocur EHA | 1.0% by weight |

(14) Preparation of Transparent Ink Composition 11B (Comparative Example 8B)

Transparent ink composition 11B was prepared in the same manner as in Examples 1B to 4B with the exception that the composition was changed to the following:

| | |
|---|---|
| NVF | 66.0% by weight |
| Tripropylene glycol diacrylate | 20.0% by weight |
| Glycerin EO-modified triacrylate | 10.0% by weight |
| Irgacure 369 | 3.0% by weight |
| Darocur EHA | 1.0% by weight |

(15) Preparation of Transparent Ink Composition 12B (Comparative Example 9B)

Transparent ink composition 12B was prepared in the same manner as in Examples 1B to 4B with the exception that the composition was changed to the following:

| NVF | 66.0% by weight |
|---|---|
| Tripropylene glycol diacrylate | 20.0% by weight |
| Glycerin EO-modified triacrylate | 10.0% by weight |
| Irgacure 907 | 3.0% by weight |
| Darocur EHA | 1.0% by weight |

(16) Preparation of Transparent Ink Composition 13B (Comparative Example 10B)

Transparent ink composition 13B was prepared in the same manner as in Examples 1B to 4B with the exception that the composition was changed to the following:

| NVF | 64.0% by weight |
|---|---|
| Tripropylene glycol diacrylate | 20.0% by weight |
| Glycerin EO-modified triacrylate | 10.0% by weight |
| Irgacure 369 | 3.0% by weight |
| Polymerization accelerating fine particles 1B | 3.0% by weight |

(17) Preparation of Transparent Ink Composition 14B (Comparative Example 11B)

Transparent ink composition 14B was prepared in the same manner as in Examples 1B to 4B with the exception that the composition was changed to the following:

| NVF | 67.0% by weight |
|---|---|
| Tripropylene glycol diacrylate | 20.0% by weight |
| Glycerin EO-modified triacrylate | 10.0% by weight |
| Irgacure 819 | 2.4% by weight |
| Irgacure 369 | 0.6% by weight |
| Polymerization accelerating fine particles 1B | 3.0% by weight |

(18) Preparation of Transparent Ink Composition 15B (Comparative Example 12B)

Transparent ink composition 15B was prepared in the same manner as in Examples 1B to 4B with the exception that the composition was changed to the following:

| 2-MTA | 93.0% by weight |
|---|---|
| Irgacure 819 | 2.4% by weight |
| Irgacure 369 | 0.6% by weight |

-continued

| Darocur EHA | 1.0% by weight |
|---|---|
| Polymerization accelerating fine particles 1B | 6.0% by weight |

3B. Irradiation Experiment

Each ink composition described above was dropped onto a glass substrate, and the dose necessary for curing the ink composition with ultraviolet light having a wavelength of 365 nm (light source: i-LED, manufactured by Nichia Chemical Industries, Ltd.) at an irradiation intensity of 22 mJ/cm$^2$ was measured. It was evaluated by visual observation and touch whether curing was performed or not.

The results are shown in the following Table 2B.

[Necessary Dose, Evaluation Indexes]
A: Up to 660 mJ/cm$^2$
B: 660 to 1320 mJ/cm$^2$ 4B. Surface Curing Experiment The above-mentioned ink composition was dropped onto a glass substrate, and treated under curing conditions of an ultraviolet wavelength of 365 nm (light source: i-LED, manufactured by Nichia Chemical Industries, Ltd.), an irradiation intensity of 22 mJ/cm$^2$, an irradiation time of 60 seconds and an integrated light volume of 1320 mJ/cm$^2$. Then, the following evaluation by visual observation and touch was conducted. The results are shown in the following Table 2B.

[Surface Curability, Evaluation Indexes]
A: A surface and an inside are completely cured.
B: A state in which only a surface is cured, and an inside is in liquid form 5B. Internal Curing Experiment Treatment was performed under the same conditions as in the above-mentioned surface curing experiment, and then, the following evaluation by visual observation and touch was conducted. The results are shown in the following Table 2B.

[Internal Curability, Evaluation Indexes]
A: A surface and an inside are completely cured.
B: A state in which only a surface is cured, and an inside is in liquid form 6B. Evaluation of Crack Occurrence To the sample to which curing treatment had been performed, the evaluation of crack occurrence was visually conducted. The results are shown in the following Table 2B.

[Crack Occurrence, Evaluation Indexes]
A: No crack occurs.
B: The occurrence of cracks is observed.
C: Cured matter is cracked, resulting in separation from a base.

TABLE 2B

| | Monomer 1 (wt %) | Monomer 2 (wt %) | Monomer 3 (wt %) | Monomer 4 (wt %) | Photopolymerization Initiator 1 (wt %) | Photopolymerization Initiator 2 (wt %) |
|---|---|---|---|---|---|---|
| Example 1 | NVF 30.0 | 2-MTA 27.0 | TPGDA 25.0 | A-Gly-3E 10.0 | Irgacure 819 0.8 | Irgacure 369 0.2 |
| Example 2 | NVF 25.0 | NVCap 29.0 | TPGDA 28.0 | A-Gly-3E 10.0 | Irgacure 819 0.8 | Irgacure 369 0.2 |
| Example 3 | NVF 65.0 | TPGDA 20.0 | A-Gly-3E 10.0 | — | Irgacure 369 0.8 | Irgacure 907 0.2 |

TABLE 2B-continued

| | | | | | | |
|---|---|---|---|---|---|---|
| Example 4 | NVF 62.0 | TPGDA 17.5 | A-Gly-3E 7.5 | — | Irgacure 819 2.4 | Irgacure 369 0.6 |
| Example 5 | NVF 54.5 | TPGDA 17.5 | A-Gly-3E 15.0 | — | Irgacure 819 2.4 | Irgacure 369 0.4 |
| Example 6 | NVF 59.0 | TPGDA 17.5 | A-Gly-3E 7.5 | | Irgacure 819 2.4 | Irgacure 369 0.4 |
| Comparative Example 1 | NVF 93.0 | — | — | — | Irgacure 819 3.0 | — |
| Comparative Example 2 | NVF 93.0 | — | — | — | Irgacure 819 2.4 | Irgacure 369 0.6 |
| Comparative Example 3 | NVF 93.0 | — | — | — | Irgacure 819 2.4 | Irgacure 369 0.6 |
| Comparative Example 4 | NVF 93.0 | — | — | — | Irgacure 819 3.0 | — |
| Comparative Example 5 | NVF 83.0 | A-Gly-3E 10.0 | — | — | Irgacure 819 3.0 | — |
| Comparative Example 6 | NVF 86.0 | A-Gly-3E 10.0 | — | — | Irgacure 819 3.0 | — |
| Comparative Example 7 | NVF 66.0 | TPGDA 20.0 | A-Gly-3E 10.0 | — | Irgacure 819 3.0 | — |
| Comparative Example 8 | NVF 66.0 | TPGDA 20.0 | A-Gly-3E 10.0 | — | Irgacure 369 3.0 | — |
| Comparative Example 9 | NVF 66.0 | TPGDA 20.0 | A-Gly-3E 10.0 | — | Irgacure 907 3.0 | — |
| Comparative Example 10 | NVF 64.0 | TPGDA 20.0 | A-Gly-3E 10.0 | — | Irgacure 369 3.0 | — |
| Comparative Example 11 | NVF 67.0 | TPGDA 20.0 | A-Gly-3E 10.0 | — | Irgacure 819 2.4 | Irgacure 369 0.6 |
| Comparative Example 12 | 2-NTA 93.0 | — | — | — | Irgacure 819 2.4 | Irgacure 369 0.6 |

| | Polymerization Accelerator 1 (wt %) | Polymerization Accelerator 2 (wt %) | Coloring Material (wt %) | Necessary Dose | Surface Curability | Internal Curability | Crack |
|---|---|---|---|---|---|---|---|
| Example 1 | Darocur EHA 1.0 | PPS1 6.0 | — | A | A | A | A |
| Example 2 | Darocur EHA 1.0 | PPS1 6.0 | — | A | A | A | A |
| Example 3 | Darocur EHA 1.0 | PPS1 3.0 | — | A | A | A | A |
| Example 4 | Darocur EHA 1.0 | PPS1 6.0 | PB15:3 3.0 | A | A | A | A |
| Example 5 | Darocur EHA 1.0 | PPS1 6.0 | PBk7 3.0 | A | A | A | A |
| Example 6 | Darocur EHA 1.0 | PPS1 6.0 | TiO2 6.0 | A | A | A | A |
| Comparative Example 1 | Darocur EHA 1.0 | — | — | B | B | A | C |
| Comparative Example 2 | Darocur EHA 1.0 | — | — | B | B | A | C |
| Comparative Example 3 | Darocur EHA 1.0 | PPS1 3.0 | — | A | A | A | B |
| Comparative Example 4 | Darocur EHA 1.0 | PPS1 3.0 | — | B | B | A | B |
| Comparative Example 5 | Darocur EHA 1.0 | — | — | B | B | A | B |

TABLE 2B-continued

| | | | | | | | |
|---|---|---|---|---|---|---|---|
| Comparative Example 6 | Darocur EHA 1.0 | — | — | B | B | A | B |
| Comparative Example 7 | Darocur EHA 1.0 | — | — | B | B | A | A |
| Comparative Example 8 | Darocur EHA 1.0 | — | — | B | B | B | A |
| Comparative Example 9 | Darocur EHA 1.0 | — | — | B | B | B | A |
| Comparative Example 10 | — | PPS1 3.0 | — | B | B | B | A |
| Comparative Example 11 | — | PPS1 3.0 | — | B | B | A | A |
| Comparative Example 12 | Darocur EHA 1.0 | PPS1 6.0 | — | B | B | A | B |

In Examples 1B to 6B, the results to be satisfied were obtained in all of curing efficiency, surface curability, internal curability and the prevention of crack occurrence. However, in Comparative Examples 1B to 12B, the results were unsatisfactory in any one of curing efficiency, surface curability, internal curability and the prevention of crack occurrence.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2005-077951 and 2005-077952, each filed on Mar. 17, 2005, the contents thereof being herein incorporated by reference.

What is claimed is:

1. An ink composition containing at least a polymerizable compound, a photopolymerization initiator and a polymerization accelerator, wherein each of the polymerizable compound, the photopolymerization initiator and the polymerization accelerator comprises a combination of a plurality of compounds, wherein each of the polymerizable compound, the photopolymerization initiator and the polymerization accelerator comprises at least one compound having an amine structure, wherein the at least one compound having an amine structure of the polymerization accelerator comprises fine particles having an amino group on surfaces thereof, and wherein the ink composition is a non-solvent composition.

2. The ink composition according to claim 1, wherein the amine structure-containing compound in the polymerizable compound accounts for 30% by weight or higher of the polymerizable compound, in terms of weight ratio.

3. The ink composition according to claim 1, wherein the fine particles are an inorganic compound.

4. The ink composition according to any claim 1, wherein the fine particles are transparent.

5. An ink composition containing at least a polymerizable compound, a photopolymerization initiator and a polymerization accelerator, wherein each of the polymerizable compound, the photopolymerization initiator and the polymerization accelerator comprises a combination of a plurality of compounds, wherein each of the polymerizable compound, the photopolymerization initiator and the polymerization accelerator comprises at least one compound having an amine structure, wherein the at least one compound having an amine structure of the polymerization accelerator comprises fine particles having an amino group on surfaces thereof, and wherein the fine particles are an inorganic compound.

6. An ink composition containing at least a polymerizable compound, a photopolymerization initiator and a polymerization accelerator, wherein each of the polymerizable compound, the photopolymerization initiator and the polymerization accelerator comprises a combination of a plurality of compounds, wherein each of the polymerizable compound, the photopolymerization initiator and the polymerization accelerator comprises at least one compound having an amine structure, wherein the at least one compound having an amine structure of the polymerization accelerator comprises fine particles having an amino group on surfaces thereof, and wherein the fine particles are transparent.

* * * * *

UNITED STATES PATENT AND TRADEMARK OFFICE
CERTIFICATE OF CORRECTION

| | | |
|---|---|---|
| PATENT NO. | : 7,619,015 B2 | Page 1 of 1 |
| APPLICATION NO. | : 11/376607 | |
| DATED | : November 17, 2009 | |
| INVENTOR(S) | : Takashi Oyanagi et al. | |

It is certified that error appears in the above-identified patent and that said Letters Patent is hereby corrected as shown below:

Title Page, Item (73), Assignee: "Eiko" should read --Seiko--.

Signed and Sealed this

Fourth Day of May, 2010

David J. Kappos
*Director of the United States Patent and Trademark Office*